(12) United States Patent
Schein et al.

(10) Patent No.: US 10,088,969 B2
(45) Date of Patent: Oct. 2, 2018

(54) IMAGE-BASED AUTOMATION SYSTEMS AND METHODS

(75) Inventors: Sagi Schein, Haifa (IL); Omer Barkol, Haifa (IL); Ruth Bergman, Haifa (IL); David Lehavi, Haifa (IL); Ayelel Pnueli, Haifa (IL); Yonathan Livny, Yahod (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 544 days.

(21) Appl. No.: 14/009,580

(22) PCT Filed: May 6, 2011

(86) PCT No.: PCT/US2011/035562
§ 371 (c)(1),
(2), (4) Date: Oct. 3, 2013

(87) PCT Pub. No.: WO2012/154159
PCT Pub. Date: Nov. 15, 2012

(65) Prior Publication Data
US 2014/0033091 A1    Jan. 30, 2014

(51) Int. Cl.
*G06F 3/048* (2013.01)
*G06F 3/0481* (2013.01)
*G06F 11/36* (2006.01)
*G06F 9/455* (2018.01)
*G06F 9/451* (2018.01)

(52) U.S. Cl.
CPC ............ *G06F 3/0481* (2013.01); *G06F 9/451* (2018.02); *G06F 9/45512* (2013.01); *G06F 11/3688* (2013.01)

(58) Field of Classification Search
None
See application file for complete search history.

(56) References Cited

U.S. PATENT DOCUMENTS

| | | |
|---|---|---|
| 6,430,320 B1 | 8/2002 | Jia et al. |
| 7,461,342 B2 | 12/2008 | McLean |
| 2009/0103769 A1* | 4/2009 | Milov et al. .................. 382/100 |
| 2009/0199096 A1* | 8/2009 | Pop-Jordanov ..... G06F 11/3692 715/704 |
| 2010/0146420 A1 | 6/2010 | Bharadwaj et al. |
| 2012/0243745 A1* | 9/2012 | Amintafreshi ...... G06F 11/3692 382/103 |

FOREIGN PATENT DOCUMENTS

| | | |
|---|---|---|
| CN | 1382285 A | 11/2002 |
| EP | 0536894 A2 | 4/1993 |
| EP | 0635797 A1 | 1/1995 |

(Continued)

OTHER PUBLICATIONS

International Preliminary Report on Patentability, dated Nov. 21, 2013, PCT Application No. PCT/US2011/035562.

(Continued)

*Primary Examiner* — William C Trapanese

(57) ABSTRACT

In one implementation, an image-based automation process includes identifying a graphical object of a graphical user interface and performing an action relative to the graphical object at the graphical user interface. The identifying is based on an image including the graphical object.

20 Claims, 7 Drawing Sheets

(56) References Cited

FOREIGN PATENT DOCUMENTS

| WO | WO-02052835 A2 | 7/2002 |
| WO | WO-2006132564 A1 | 12/2006 |
| WO | WO-2008132564 A1 | 12/2006 |

OTHER PUBLICATIONS

International Search Report and Written Opnion, dated Dec. 16, 2011. PCT Application No. PCT/US2011/035562.
European Patent Office, The Extended European Search Report, dated Aug. 14, 2014, 8 pages, Munich, Germany.
XP-2383091A—Redstone Software's primary product.
XP-2383092A—AcuTest is the ideal software test automation solution.
Anonymous, "Acutest" Retrieved from the Internet: <http://web.archive.org/web/20040711080728/http://www.tevron.com/acutest.asp> [retrieved on May 30, 2006], 2 pages.
Anonymous, Software Automation & Testing, Retrieved from the Internet: <http://web.archive.org/web/20040627105104/http://www.redstonesoftware.com/eggplantoverview/eggplant+orverview.pdf> [retrieved on May 30, 2006], 19 pages.
Extended European Search Report, dated Aug. 14, 2014, European Patent Application No. 11865318.7, 8 pages.

\* cited by examiner

IMAGE-BASED AUTOMATION SYSTEMS AND METHODS

CROSS-REFERENCE TO RELATED APPLICATION

This application is a U.S. National Stage Application of and claims priority to International Patent Application No. PCT/US2011/035562, filed on May 6, 2011, and entitled "IMAGE-BASED AUTOMATION SYSTEMS AND METHODS".

BACKGROUND

Software automation systems perform actions on software applications without receiving commands related to those tasks from a user. Traditional, software automation systems rely on a record and replay paradigm. A sequence of actions is recorded in a record phase, and the actions are then automatically performed with respect to a software application in a replay or automation phase.

Typically, software automation systems rely on an understanding of the runtime environment of a software application that is to be automated. For example, a software automation system communicates with the runtime environment of the software application to receive information related to actions within the software application during a record phase. The software automation system then sends instructions to the runtime environment to perform those actions during the replay or automation phase.

DETAILED DESCRIPTION

Figure 1:
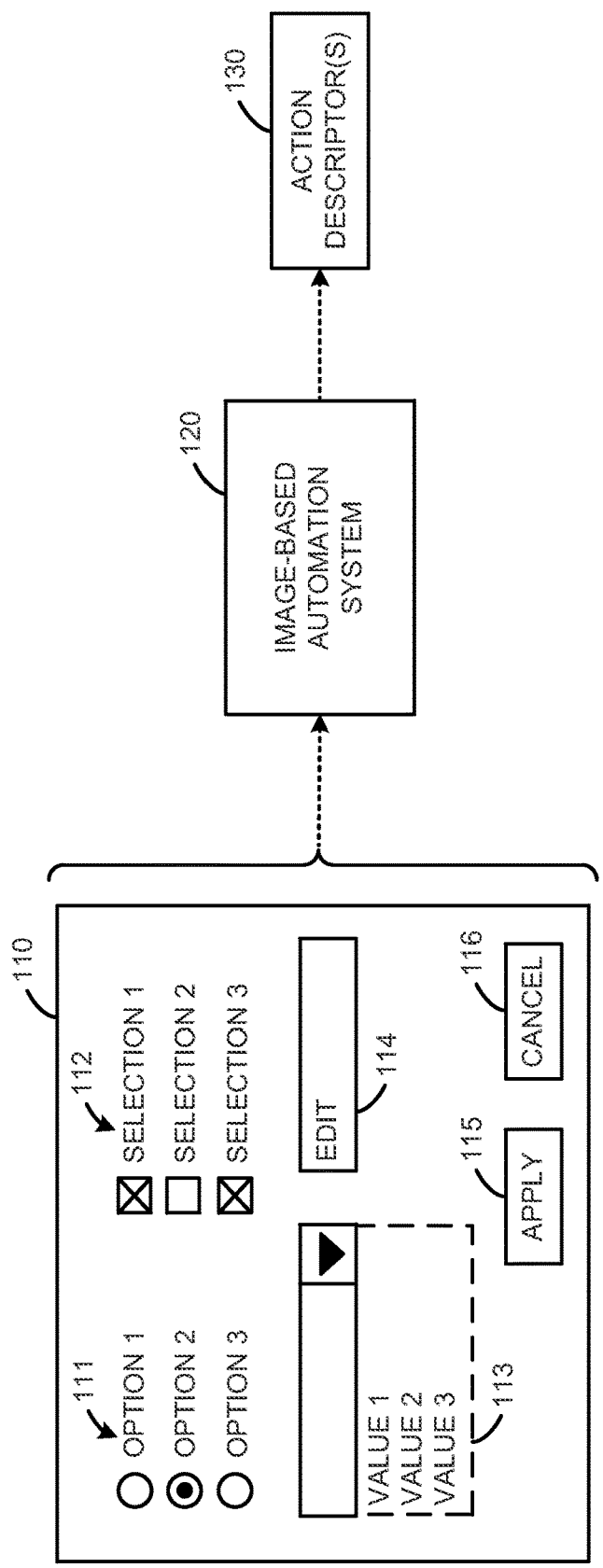
FIG. 1 is an illustration of an image-based automation system in a record phase, according to an implementation.

Known software automation systems (or automation systems) typically rely on an understanding of and/or relationship with the runtime environment (e.g., a Java™ runtime environment or a Microsoft .Net™ runtime environment) of a software application that is to be automated. For example, such automation systems automate the performance of actions at or with respect to a software application by interacting (e.g., communicating) with the runtime environment of the software application to record actions at or with respect to the graphical objects (e.g., buttons, sliders, icons, lists, or text boxes) of the software application in a record phase, and then interacting with the runtime environment of the software application to replay or perform those actions at or with respect to the graphical objects in a replay or automation phase. Software applications that are recorded during a record phase of an automation system and software applications are which actions are performed by an automation system can collectively be referred to as automated software applications.

As a specific example, an automation system can receive an identifier of a graphical object and an identifier of an action that is performed at the graphical object from the runtime environment during a record phase. The automation system can replay that action by providing the identifier of the graphical object and the identifier of the action to the runtime environment during a replay phase. Accordingly, such automation systems rely on communication with and an understanding of (e.g., a capability to interpret identifiers from) the runtime environment to record and replay actions.

Implementations discussed herein include image-based software automation systems (or image-based automation systems) that identify graphical objects at which actions occur using images (e.g., visual representations such as bitmaps, JPEG formatted images, or other visual representations) of, for example, a software application. For example, image-based automation systems discussed herein record actions performed (e.g., that generate system events such as mouse down events, mouse move events, etc.) at graphical objects identified based on images of or including an automated software application (e.g., images in which an automated software application is shown or represented). Furthermore, image-based software automation systems discussed herein can access descriptions of actions and graphical objects (e.g., descriptions of actions and graphical objects generated during a record phase, descriptions of actions and graphical objects generated during a record phase and later modified, or descriptions of actions and graphical objects generated by a system administrator), and replay those actions at those graphical objects based on different images of the automated software application.

Because such image-based software automation systems do not rely on an understanding of the runtime environments of the software applications being automated (e.g., the runtime environments within which these software application are executed), software applications under different runtime environments or platforms (e.g., different operating systems) can be automated using these image-based software automation systems. Moreover, such image-based automation systems need not be modified or updated each time a runtime environment is changed or a new runtime environment is introduced.

As used herein, the singular forms "a," "an," and "the" include plural referents unless the context clearly dictates otherwise. Thus, for example, the term "image" is intended to mean one or more images or a combination or sequence of images. Additionally, as used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted or at a processor), or hardware and software hosted at hardware.

As an example of an image-based automation system, FIG. 1 is an illustration of an image-based automation system in a record phase, according to an implementation.

Graphical user interface (or "GUI") 110 is an image-based user interface of a software application that is hosted at a computing device and will be automated (e.g., actions will be performed with respect to the graphical objects of GUI 110 without a user during a replay phase of image-based automation system 120). GUI 110 is displayed to a user as images that include various graphical objects at which users can perform actions. Graphical objects are portions of an image. For example, graphical objects can be icons within an image. Icons are portions of an image or sub-images within an image that represent a resource and/or a functionality. As a specific example, controls within a GUI are icons that represent resources and/or functionalities available or accessible via the GUI are graphical objects. That is, a GUI is an image that includes one or more graphical objects. Examples of such controls include control buttons (e.g., push buttons and radio buttons), check boxes, edit boxes, lists (e.g., scroll lists and drop-down lists), applications access controls (e.g., icons that represent software applications), file access controls (e.g., icons that represent files), and resource access control (e.g., icons that represent resources such as services accessible via a communications link).

Specifically, GUI 110 includes radio button group 111 with three radio button controls (labeled "OPTION 1," OPTION 2," and "OPTION 3"), check box group 112 with three check box controls (labeled "SELECTION 1," SELECTION 2," and "SELECTION 3"), drop-down list control 113 (including entries "VALUE 1," VALUE 2," and "VALUE 3"), edit box control 114, and push button controls 115 and 116. In other implementations, GUI 110 can include additional or fewer controls that the controls illustrated in FIG. 1. For example, graphical user interface 110 can exclude edit box control 114 and can include an application access control (e.g., an icon) that represents a software application, and causes that software application to be executed at a computing device hosting the software application including GUI 110.

Image-based automation system 120 accesses images of GUI 110 to determine whether an action has been performed at a graphical object of GUI 110 (or the software application including GUI 110). For example, each time an action (e.g., a input marker such as a mouse cursor moves, a mouse click occurs, or a keyboard event such as a key down event or key up event) occurs at GUI 110, image-based automation system 120 accesses an image of GUI 110 to determine whether an action occurred at a graphical object of GUI 110. As an example, an operating system within which the software application including GUI 110 is hosted can provide a notification of the action to image-based automation system 120. Alternatively, image-based automation system 120 can receive each action that occurs within an operating system of a computing device hosting image-based automation system 120, and image-based automation system 120 can access an image of GUI 110 to determine whether that action occurred at a graphical object of GUI 110.

An action is some input that is performed relative to a display or position at a display. For example, an action can be performed relative to a graphical object. Actions include, for example, movement of a mouse cursor; clicking or double clicking with a mouse cursor; a click and drag movement at, near, or across a graphical object; a keyboard event when a graphical object is selected or has an input focus; and highlighting a graphical object.

In some implementations, image-based automation system 120 receives the notification of the action, accesses an image of GUI 110, identifies the location of an input marker (e.g., a cursor such as a mouse cursor), identifies a graphical object in close proximity to the cursor, and determines whether the action occurred at the graphical object. For example, image-based automation system 120 can receive an image of GUI 110 in response to a user of GUI 110 clicking on the radio button control labeled "OPTION 2" with a mouse cursor (not shown). Image-based automation system 120 identifies the mouse cursor and identifies the radio button control labeled "OPTION 2" under the mouse cursor. Image-based automation system 120 then outputs an action descriptor to action record 130. In other words, image-based automation system 120 outputs an action descriptor to action record 130 if the action occurred at a graphical object. An action descriptor describes an action. For example, an action descriptor can include a description of an action and a description of a graphical object relative to which that action was performed. Said differently, the action descriptor describes an action and a graphical object at which that action should be performed during a replay phase of image-based automation system 120.

Action record 130 is a file or other data repository at which action descriptors are stored. For example, action record 130 can be a script file that is accessible to image-based automation system 120 during a replay phase. That is, action descriptors can be stored as instructions within a script file (i.e., action record 130), and image-based automation system 120 can access those instructions to perform actions at GUI 110 during a replay phase.

In other implementations, image-based automation system 120 receives a notification of the action and a location of the action (e.g., relative to a display of a computing device), accesses an image of GUI 110, identifies a graphical object in close proximity to the cursor, and determines whether the action occurred at the graphical object. In other words, rather than locate the location or position of an input marker, image-based automation system 120 receives the location of the action from an operating system of a computing device hosting image-based automation system 120. As a specific example, the notification of the action can also include a location identifier such as a pair of Cartesian or polar coordinates relative to the an output device such as a display at which GUI 110 is output or displayed that identifies the location or position at which the action occurred. Alternatively, for example, the location identifier can be relative to GUI 110 rather than an output device at which GUI 110 is displayed. Image-based automation system 120 then outputs an action descriptor to action record 130 if the action occurred at a graphical object.

Figure 2:
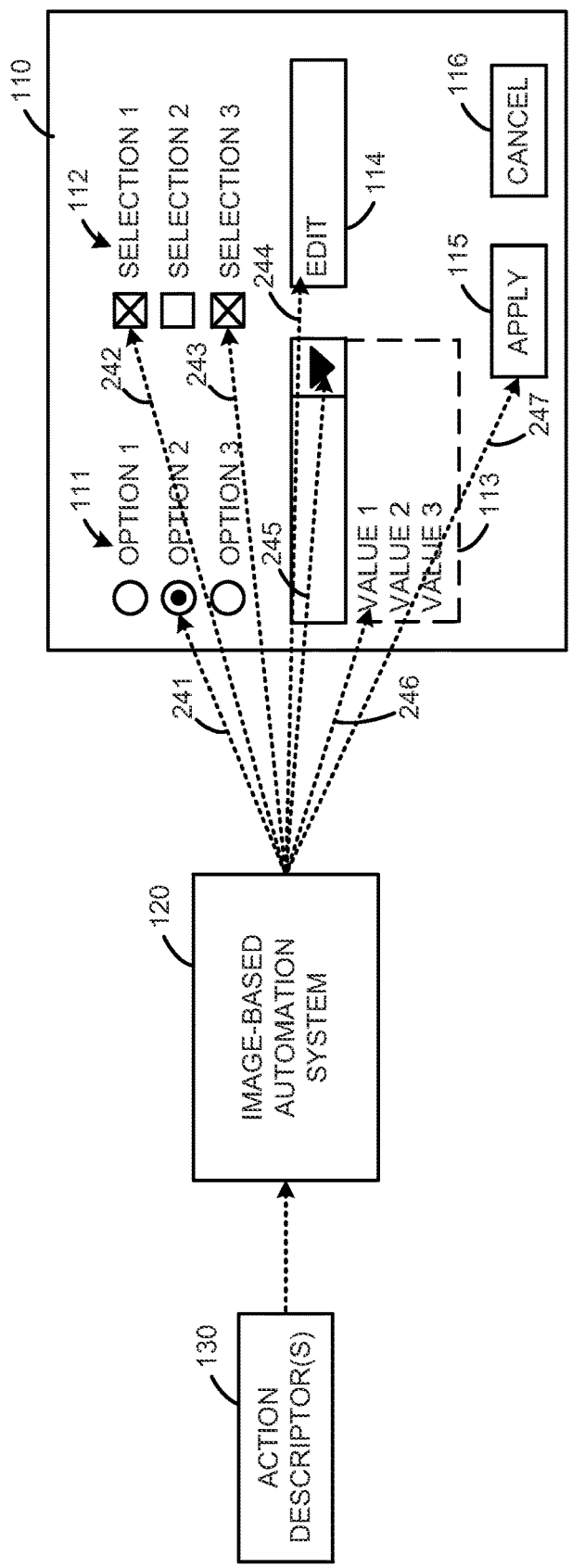
FIG. 2 is an illustration of an image-based automation system in a replay phase, according to an implementation.

FIG. 2 is an illustration of an image-based automation system in a replay phase, according to an implementation. As illustrated in FIG. 2, image-based automation system 120 accesses or receives action descriptors 130 and performs actions relative to GUI 110 (or the graphical objects of GUI 110) in response to or based on action descriptors 130.

More specifically, as illustrated in FIG. 2, image-based automation system 120 accesses an action descriptor and selects the radio button control labeled "OPTION 2" of radio button group control 111 in response to that action descriptor as illustrated by indicator 241. More specifically, image-based automation system 120 accesses an image of GUI 110 in response to accessing the action descriptor and identifies the radio button control labeled "OPTION 2" based on the description of the radio button control labeled "OPTION 2" (a graphical object) within the action descriptor. Image-based automation system 120 then determines a location of the radio button control labeled "OPTION 2". For example, image-based automation system 120 can determine the location of the radio button control labeled "OPTION 2" relative to a display or frame buffer of a computing device hosting GUI 110 or relative to GUI 110. As a specific example, image-based automation system 120 can determine the location of the radio button control labeled "OPTION 2" as a number of horizontal pixels and a number of vertical pixels from the upper-right corner, upper-left corner, or some other reference point of display or frame buffer of a computing device hosting GUI 110 or of GUI 110.

Image-based automation system 120 then performs an action at the location of the radio button control labeled "OPTION 2". For example, the action descriptor can include a description of an action and image-based automation system 120 performs that action at the location of the radio button control labeled "OPTION 2". As a specific example, the action can be a click action to select the radio button control labeled "OPTION 2". That is, image-based automation system 120 clicks (or generates or performs a click action) at the radio button control labeled "OPTION 2". For example, image-based automation system 120 can trigger an event associated with the click action (e.g., a mouse button down event and a mouse button up event) at the location of the radio button control labeled "OPTION 2" previously identified by image-based automation system 120 by providing the event (or information associated with the event) to an operating system hosting GUI 110 via an application programming interface ("API") of the operating system.

Similarly, indicators 242, 243, 244, 245, 246, and 247 indicate other actions. That is, image-based automation system 120 can access actions descriptors 130 and perform the actions illustrated by indicators 242, 243, 244, 245, 246, and 247 at GUI 110. Indicator 242 illustrates a click action at the check box control labeled "SELECTION 1". Similarly, indicator 234 illustrates a click action at the check box control labeled "SELECTION 3". Indicator 244 illustrates a keyboard action (e.g., typing) at edit box control 114. That is, image-based automation system 120 identifies edit box control 114 using an image of GUI 110 and performs one or more actions at edit box control 114 to input text at edit box control 114.

Indicators 245 and 246 illustrate a click action at drop down list control 113 and a click action at the option labeled "VALUE 1", respectively. Indicator 247 illustrates a click action at push button 115. Additionally, action descriptors 130 can include action descriptors that are associated with actions other than the actions illustrated in FIG. 2 (e.g., include descriptors of actions such as moving a mouse cursor above or across a graphical object; double clicking on a graphical object with a mouse cursor; a click and drag movement at, near, or across a graphical object; a keyboard event when a graphical object is selected or has an input focus; and highlighting a graphical object).

Figure 3:
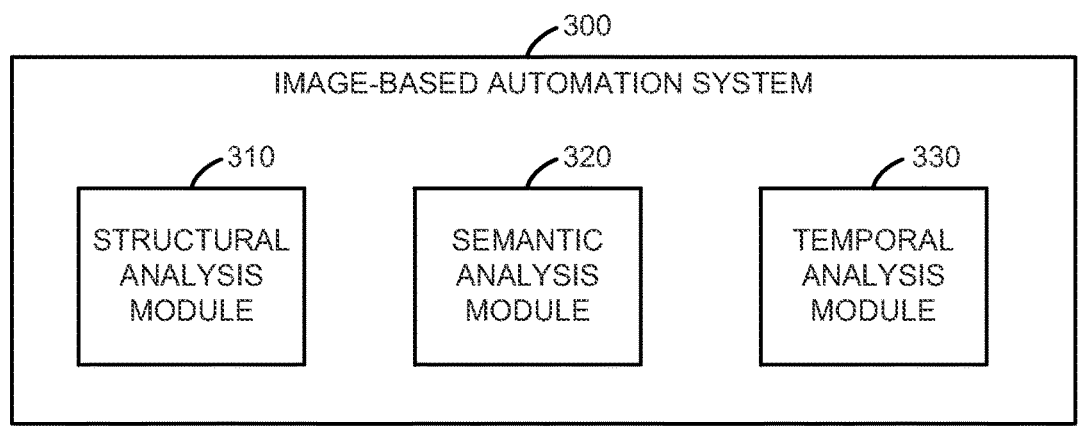
FIG. 3 is a schematic block diagram of an image-based automation system, according to an implementation.

FIG. 3 is a schematic block diagram of an image-based automation system, according to an implementation. Image-based automation system 300 includes structural analysis module 310, semantic analysis module 320, and temporal analysis module 330. Although structural analysis module 310, semantic analysis module 320, and temporal analysis module 330 are illustrated as separate modules of image-based automation system 300, the functionalities, operations, or features of one module can be performed or included at another module. For example, some functionalities, operations, or features of temporal analysis module 330 can be performed or included at semantic analysis module 320. Structural analysis module 310 includes hardware such as a processor or application-specific integrated circuit ("ASIC"), software stored at a memory and executed from the memory at a processor, or a combination thereof to identify graphical objects within an image using structural analysis. For example, structural analysis module 310 receives an image including graphical objects, and structural analysis module 310 identifies portions of the image as graphical objects based on structural features of the image such as edges, shadows, shapes, and/or other structural features.

Semantic analysis module 320 includes hardware such as a processor or application-specific integrated circuit ("ASIC"), software stored at a memory and executed from the memory at a processor, or a combination thereof to generate semantic information related to graphical objects of an image using semantic analysis. For example, semantic analysis module 320 extracts semantic information from an image that describes graphical objects of that image. As a specific example, semantic information about a graphical object can be included in a semantic description that identifies the graphical object as part of a set of graphical objects (e.g., the graphical object is the first radio button included in a radio button), includes text of the graphical object, includes a description of an action at the graphical object, identifies the type or class of the graphical object, or includes an image of the graphical object.

Furthermore, semantic analysis module 320 can generate semantic information related to a graphical object from multiple images including that graphical object. For example, semantic analysis module 320 can generate semantic information related to a graphical object based on the appearance of the graphical object in a first image. Semantic analysis module 320 can then generate additional, revised, or refined semantic information related to the graphical object based on the appearance of the graphical object in a second image. As a specific example, semantic analysis module 320 can generate semantic information related to a push button based on an image in which the push button is not depressed. For example, that the push button is a particular color. Semantic analysis module 320 can then refine that semantic information based on another image in which the push button is depressed. For example, that the push button is a different color when depressed.

Temporal analysis module 330 includes hardware such as a processor or application-specific integrated circuit ("ASIC"), software stored at a memory and executed from the memory at a processor, or a combination thereof to determine relationships between actions at graphical objects. For example, temporal analysis module 330 can receive semantic descriptions related to graphical objects and determine whether two or more of the semantic descriptions are related to a common graphical object and/or action. As a specific example, an action can include or be based on two or more other actions or sub-actions, and temporal analysis module 330 can determine whether multiple sub-actions should be aggregated into an action with respect to a graphical object. Said differently, temporal analysis module 330 determines whether multiple actions are associated with or part of a common action at a graphical object.

As a specific example, temporal analysis module 330 can receive a first semantic description in response to a mouse button down action at a graphical object and can receive a second semantic description in response to a mouse button up action at the graphical object. Temporal analysis module 330 then determines that the first semantic description and the second semantic description describe two portions of a single click action based on, for example, the temporal proximity of the first semantic description and the second semantic description, and aggregates the first semantic description and the second semantic description into a third semantic description. The third semantic description includes a description of a click action rather than a mouse button down action and a mouse button up action.

Additionally, temporal analysis module 330 can aggregate more or different semantic descriptions into a semantic description that describes a single action. For example, temporal analysis module 330 can aggregate a semantic description of a mouse button down action, semantic descriptions of mouse move actions, and a semantic description of a mouse button up action into a semantic description of a click and drag action relative to a graphical object. Alternatively, for example, temporal analysis module 330 can determine that the first semantic description received in response to the mouse button down action at the graphical object is a complete or discrete action, and can output an action descriptor based on the first semantic description. As a specific example, temporal analysis module 330 can determine that the first semantic description received in response to the mouse button down action at the graphical object is a complete or discrete action if no other semantic descriptions related to or associated with the graphical object are received within a predetermined or preselected time period.

Figure 4:
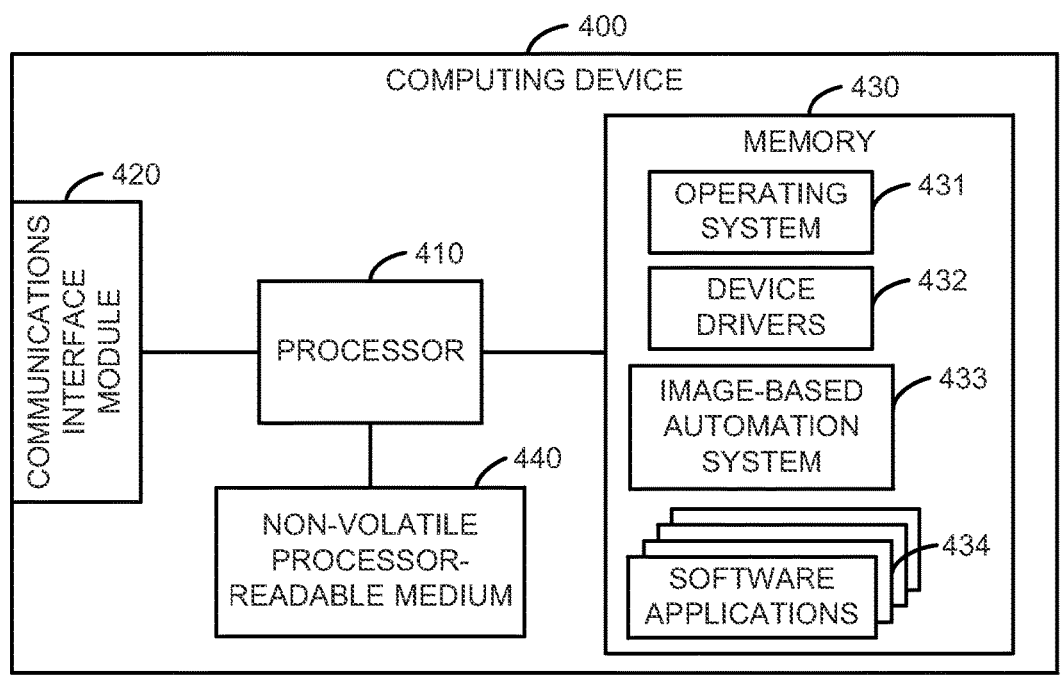
FIG. 4 is a schematic block diagram of a computing device hosting an image-based automation system, according to an implementation.

FIG. 4 is a schematic block diagram of a computing device hosting an image-based automation system, according to an implementation. As illustrated in FIG. 4, image-based automation system 433 is hosted (i.e., implemented as codes that when executed at computing device 400 cause computing device 400—or processor 410—to perform, for example, processes or functions of an image-based automation systems discussed herein) at computing device 400. Accordingly, computing device 400 can be referred to as an image-based automation system when hosting image-based automation system 433.

As illustrated in FIG. 4, computing device 400 includes communications interface module 420, processor 410, memory 430, and non-volatile (i.e., non-transitory) processor-readable medium 440. Processor 410 is operatively coupled to communications interface module 420, memory 430, and non-volatile processor-readable medium 440.

Processor 410 is any of a variety of processors. For example, processor 410 can be a general-purpose processor or an application-specific processor and can be implemented as hardware and/or software hosted at hardware. Hardware is, for example, a microprocessor, a microcontroller, an application-specific integrated circuit ("ASIC"), a programmable logic device ("PLD") such as a field programmable gate array ("FPGA"), and/or other circuitry that performs operations. Software is, for example, processor-executable instructions, commands, codes, firmware, and/or programming stored at a memory and executed (or hosted) at a processor. Software can be defined using one or more programming languages such as Java™, C++, C, an assembly language, a hardware description language, and/or another suitable programming language. For example, processor 410 can be a virtual machine hosted at a computer server including a microprocessor and a memory.

In some implementations, processor 410 can include multiple processors. For example, processor 410 can be a microprocessor including multiple processing engines (e.g., computation, algorithmic or thread cores). As another example, processor 410 can be a computing device including multiple processors with a shared clock, memory bus, input/output bus, and/or other shared resources. Furthermore, processor 410 can be a distributed processor. For example, processor 410 can include multiple computing devices, each including a processor, in communication one with another via a communications link such as a computer network.

Memory 430 can be separate from processor 410 or can be external and accessible to processor 410. Typically, as illustrated in FIG. 4, memory 430 includes processor-executable instructions or codes (e.g., computer codes or object codes) defining software applications that are executed by or are hosted at processor 410 during operation of computing device 410. For example, memory 430 can be a random-access memory ("RAM") that includes processor-executable instructions that define operating system 431, device drivers 432, image-based automation system 433, and software applications 434 (i.e., processor-executable instructions that define software applications). Software applications 434 can include one or more software applications that are automated by image-based automation system 433 (e.g., relative to which image-based automation system 433 performs actions). In other words, operating system 431, device drivers 432, image-based automation system 433, and software applications 434 at memory 430 and executed at processor 410 are hosted at computing device 400 (or at processor 410).

Typically, operating system 431, device drivers 432, image-based automation system 433, software applications 434, and/or data values are also stored at non-volatile processor-readable medium 440. In some implementations, processor 410 transfers or loads operating system 431, device drivers 432, image-based automation system 433, software applications 434, and/or data values into memory 430 during an initialization or boot sequence of computing device 400, and operating system 431, device drivers 432, image-based automation system 433, software applications 434, and/or data values are accessed at or executed from memory 430 during operation of computing device 400. That is, non-volatile processor-readable medium 440 can function as a persistent or non-transient data store or memory for processor-executable codes or instructions, data value, and/or other information stored during operation of computing device 400 at memory 430. Accordingly, memory 430 and non-volatile processor-readable medium 440 can be referred to generically as memory of computing device 400.

Processor-readable media are media that can be accessed by a processor. For example, a processor-readable medium is a device at which processor 410 can read information (e.g., processor-executable instructions or data values). Examples of processor-readable media include, but are not limited to: magnetic storage media such as a hard disk, a floppy disk, and/or magnetic tape; optical storage media such as a compact disc ("CD"), a digital video disc ("DVDs"), a compact disc read-only memory ("CD-ROM"), and/or a holographic device; magneto-optical storage media; non-volatile memory such as read-only memory ("ROM"), programmable read-only memory ("PROM"), erasable programmable read-only memory ("EPROM"), electronically erasable read-only memory ("EEPROM"), and/or FLASH memory; and RAM. In other words, processor-readable media are media from which a processor can access information (e.g., processor-executable instructions or codes and/or data values). Accordingly, non-volatile processor-readable medium 440 is a processor readable memory and memory 430 is also a processor-readable medium.

In some implementations, image-based automation system 433 can be installed or loaded into computing device 400 from a processor-readable medium such as a DVD or CD. As an example, image-based automation system 433 can be included within an installation package at a DVD (not shown). The DVD can be inserted into computing device 400, and processor 410 can execute the installation package to install image-based automation system 433 at computing device 400. Alternatively, for example image-based automation system 433 can be installed or loaded from a processor-readable medium including a USB interface such as a USE FLASH drive or a USB hard disk drive, or at a processor-readable medium accessible to computing device 400 via a communications link and communications interface module 420.

Examples of processor-executable code or instructions (e.g., computer code or instructions) include, but are not limited to, micro-code or micro-instructions, machine instructions, such as produced by a compiler, and files containing higher-level instructions that are executed by a computer using an interpreter. For example, an implementation may be realized or implemented using Java™, C++, a script interpreter, or other object-oriented programming language and development tools. Additional examples of processor-executable code include, but are not limited to, script instructions, encrypted code, and compressed code.

Non-volatile processor-readable medium 440 can be, for example, a hard disk within computing device 400 that includes software loaded or copied to non-volatile processor-readable medium 440 from another processor-readable medium such as a DVD or CD. In some implementations, non-volatile processor-readable medium 440 can be external to or removable from computing device 400. For example, non-volatile processor-readable medium 440 can include a Universal Serial Bus™ ("USB") interface (or interface module) and non-volatile processor-readable medium 440 can be FLASH memory device with a USB interface. In other implementations, non-volatile processor-readable medium 440 can be integrated with processor 410.

In yet other implementations, non-volatile processor-readable medium 440 can be remote from computing device 400 and computing device 400 can access non-volatile processor-readable medium 440 via a communications link (e.g., a computer network). As a specific example, non-volatile processor-readable medium 440 can be (or be at) a data store or data storage service accessible via a communications link operatively coupled to communications interface module 420. Computing device 400 can boot by copying processor-executable codes or instructions from non-volatile processor-readable medium 440 to memory 430 via communications interface module 420, and executing the processor-executable codes or instructions at processor 410.

Communications interface module 420 is an interface accessible to processor 410 to communicate with (i.e., transmit symbols representing data to and receive such symbols from) other processors and/or computing devices via a communications link. In some implementations, image-based automation system 433 outputs information related to image-based software automation via communications interface module 420. More specifically, communications interface module 420 can receive data from processor 410 and transmit symbols representing those data via a communications link such as a network cable, a local area network ("LAN"), or the Internet. For example, communications interface module 420 can be a telephone network interface, a twisted-pair network interface, a coaxial network interface, a fiber-optic network interface, a wireless network interface such as a wireless local area network ("WLAN") or a cellular network, and/or some other network or communications interface module.

In some implementations, computing device 400 can include additional modules or components. For example, computing device 400 can include a graphical interface module (not shown) to provide signals to a display to output information relation to image-based software automation. That is, computing device 400 can output, for example, GUIs, operational parameters or statistics, error conditions or other information related to image-based software automation.

Figure 5:
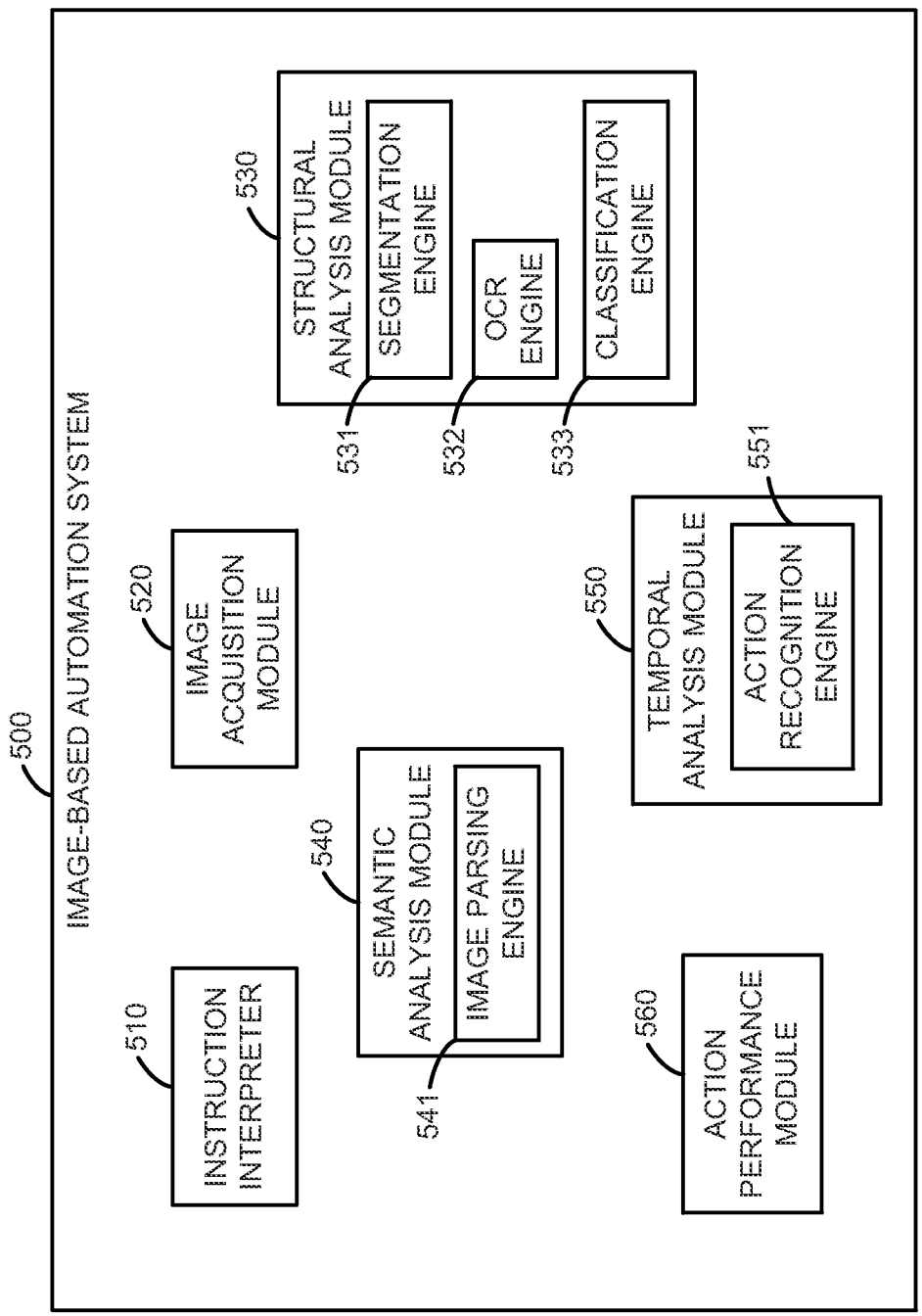
FIG. 5 is a schematic block diagram of an image-based automation system, according to another implementation.

FIG. 5 is a schematic block diagram of an image-based automation system, according to another implementation. Image-based automation system 500 is similar to image-based automation system 300 and includes structural analysis module 530, semantic analysis module 540, and temporal analysis module 550 which are similar to structural analysis module 310, semantic analysis module 320, and temporal analysis module 330, respectively, discussed above in relation to FIG. 3. Additionally, image-based automation system 500 includes instruction interpreter 510, image acquisition module 520, and action generation module 560. Furthermore, additional components or elements of structural analysis module 530, semantic analysis module 540, and temporal analysis module 550 are illustrated in FIG. 5.

Instruction interpreter 510 includes hardware such as a processor or application-specific integrated circuit ("ASIC"), software stored at a memory and executed from the memory at a processor, or a combination thereof to determine an action and a graphical object at which the action should be performed based on an instruction. As discussed above, instructions can include or be based on action descriptors generated by an image-based automation system during a record phase. Thus, instruction interpreter 510 can determine an action and a graphical object at which the action should be performed based on an action descriptor generated at an earlier time at image-based automation system 500.

Additionally, an instruction can describe an action or a graphical object at which the action should be performed that is different from the action or graphical object described in an action descriptor generated by an image-based automation system. Said differently, a script including instructions that are interpreted by instruction interpreter 510 can be edited to alter actions and/or the graphical objects at which the actions should be performed. For example, an instruction can be edited to alter a click action to a double click action or a graphical object to be the second check box control in a check box control set rather than the first check box control in the check box control set. Furthermore, an instruction can be edited to alter text that is entered at an edit box control or to perform an action at a graphical object with text different from the text of the graphical object previously associated with (e.g., within a common action descriptor) that action. Thus, instructions interpreted at instruction interpreter 510 during a replay phase of image-based automation system 500 can be different from instruction defined using action descriptors generated during a record phase of image-based automation system 500 or another image-based automation system.

Image acquisition module 520 includes hardware such as a processor or application-specific integrated circuit ("ASIC"), software stored at a memory and executed from the memory at a processor, or a combination thereof to access images of a software application that is automated (image-based automation system 500 is in a record phase) or will be automated (image-based automation system 500 is in a replay phase). For example, image acquisition module 520 can generate or access screenshots of a display at which a GUI of a software application is output. In some embodiments, image acquisition module 520 is external to image-based automation system 500. As an example, image acquisition module 520 can be a screenshot utility or service of an operating system hosting image-based automation system 500 or an automated software application. Image-based automation system 500 can communicate with image acquisition module 520 to access images of an automated software application (e.g., screenshots of a GUI of the automated software application).

As illustrated in FIG. 5, structural analysis module 530 includes segmentation engine 531, optical character recognition ("OCR") engine 532, and classification engine 533. Segmentation engine 531 is a module (or sub-module of structural analysis module 530) that segments an image (e.g., an image accessed via image acquisition module 520) into candidate graphical objects. For example, because graphical objects such as controls at a GUI are designed to visually stand out or contrast with the background, segmentation engine 531 can identify graphical objects using, for example, boundaries, borders, or other structural features of candidate graphical objects or images including candidate graphical objects. As a specific example, segmentation engine 531 can use changes in the image (or a sequence of images) over time (e.g., changes in the appearance of a portion of an image when an input cursor is over or on, selects (e.g., clicks), drags, or otherwise interacts with that portion of the image), edge detection, component analysis, and other image analysis methods to identify candidate graphical objects (e.g., portions of the image that are potentially graphical objects).

Similarly, OCR engine 532 is a module (or sub-module of structural analysis module 530) that identifies text (e.g., alpha-numeric or other characters) within an image. This text provides information about portions of an image. For example, push button controls of a GUI often include text to indicate a functionality of those push button controls. Thus, structural analysis module 530 can use information about text at an image generated at OCR engine 532 to identify graphical objects. In some implementations, OCR engine 532 provides text related to a graphical object to semantic analysis module for inclusion in a semantic description of a graphical object.

Classification engine 533 is a module (or sub-module of structural analysis module 530) that classifies candidate graphical objects into classes of graphical objects. In other words, candidate graphical objects are provided to classification engine 533, and classification engine 533 indicates with which class or type, if any, of graphical object the candidate graphical object is associated. After a candidate graphical object has been classified into a class of graphical object, the candidate graphical object can be referred to as a graphical object.

Classification engine 533 can use any of a variety of classification techniques. For example, classification engine 533 can be trained using a training set of graphical objects and classes of graphical objects in a supervised training environment or an unsupervised training environment. Additionally, classification engine 533 can use a Support Vector Machine, K-means clustering, Mean-Shift clustering, or GrabCut clustering classification techniques. Furthermore, classification engine 533 can classify graphical objects using appearance-invariant signatures of the graphical objects to prevent changes in the appearance (e.g., scaling changes or color changes) from altering the classification of a graphical object. Such appearance-invariant signatures can be based on gradients, derivatives, integrals, and/or other analysis of graphical objects such as changes in graphical objects (or a sequence of images including graphical objects) over time.

Semantic analysis module 540 includes image parsing engine 541. Image parsing engine 541 is a module (or sub-module of semantic analysis module 540) that analyzes an image for semantic information related to graphical objects identified by structural analysis module 530. That is, image parsing engine 541 parses or analyzes an image to extract descriptive information about graphical objects. For example, image parsing engine 541 can determine or recognize that a check box button control is part of a check box button control set, that the check box button control includes text (e.g., text provided by OCR engine 532), or that a push button control is at a location relative to another graphical object. As discussed above, semantic analysis module 540 generates semantic descriptions of graphical objects that include descriptive information about the graphical objects and actions at the graphical objects.

Temporal analysis module 550 includes action recognition engine 551. Action recognition engine 551 is a module (or sub-module of temporal analysis module 550) that temporally analyzes or correlates semantic descriptions of graphical objects to determine whether multiple semantic descriptions should be aggregated into a common semantic description. In other words, action recognition engine 551 correlates semantic descriptions to determine whether the semantic descriptions describe multiple portions of an action at one or more graphical objects. If the semantic descriptions describe multiple portions of an action at one or more graphical objects, temporal analysis module 550 aggregates those semantic descriptions before image-based automation system 500 outputs an action descriptor for that action. If the semantic descriptions describe different actions, image-based automation system 500 outputs action descriptors for those actions individually.

Action performance module 560 includes hardware such as a processor or application-specific integrated circuit ("ASIC"), software stored at a memory and executed from the memory at a processor, or a combination thereof to perform an action at a graphical object. For example, action performance module 560 can provide descriptions of events based on actions described in instructions interpreted at instruction interpreter 510 to an event or message queue of an operating system hosting image-based automation system 500 or an automated software application. As a specific example, action performance module 560 can provide a description of an event including a location of a graphical object and an identifier of an action to a message queue of an operating system hosting an automated software application. The operating system then generates the action at the location of the graphical object.

In some implementations, action performance module 560 performs multiple actions in response to a single instruction interpreted at instruction interpreter 510. For example, an instruction can specify a click and drag action relative to a location of a graphical object (or relative to the graphical object), and action performance module 560 can perform a mouse button down action, one or more mouse move actions, and a mouse button up action in response to the click and drag action. In other words, an aggregate action based on multiple actions aggregated by action recognition engine 551 can be disaggregated by action performance module 560, for example, to perform the aggregate action within an operating system than supports the aggregate action as multiple simple or atomic actions.

Figure 6:
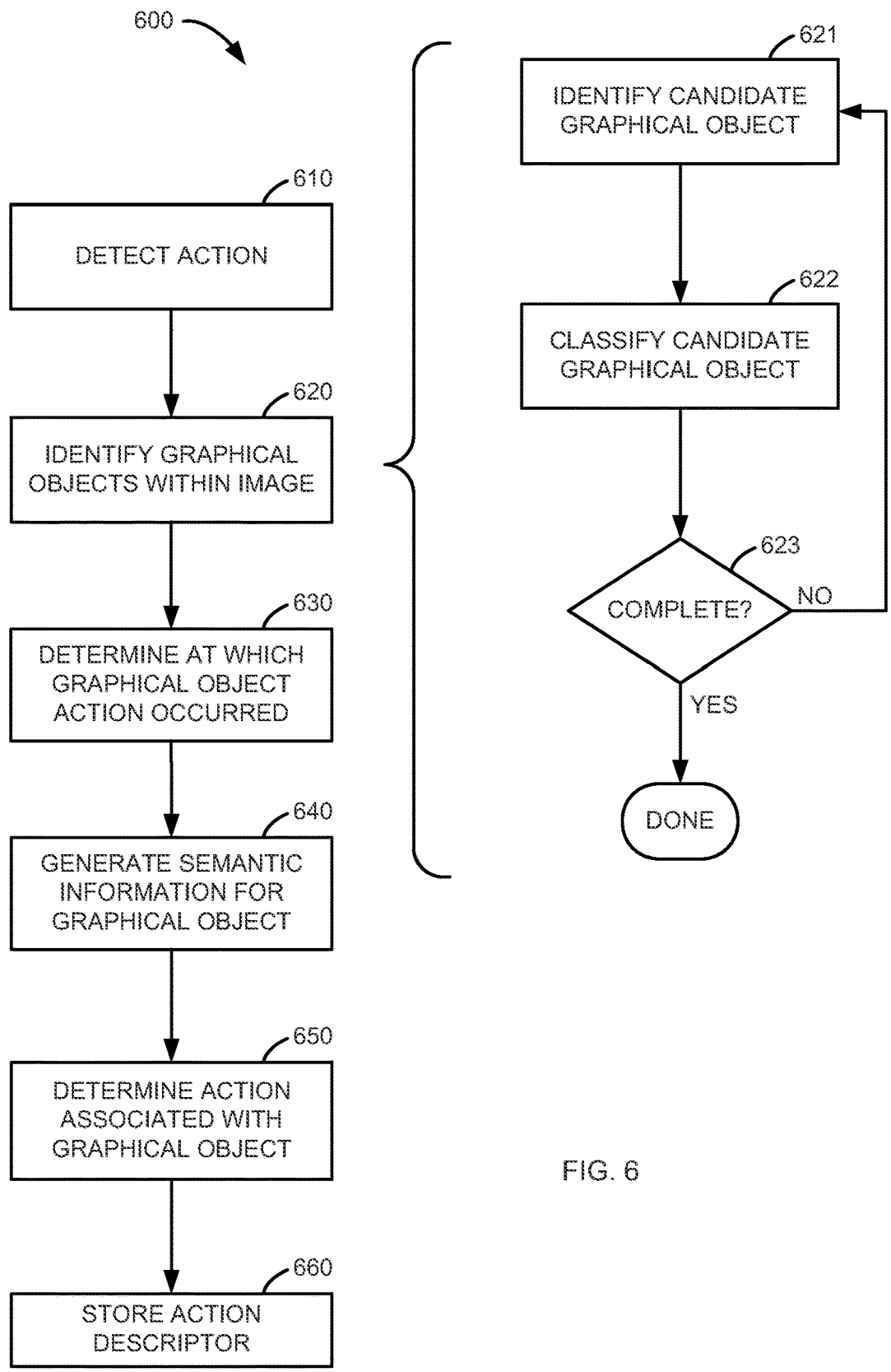
FIG. 6 is a flowchart of a process to determine actions associated with graphical objects, according to an implementation.

FIG. 6 is a flowchart of a process to determine actions associated with graphical objects, according to an implementation. Process 600 can be implemented as a hardware module, as a software module hosted at a computing device, and/or as a combination of a hardware module and a software module. For example, process 600 can be implemented as application-specific circuitry or as a software module including instructions stored at a memory and executed at a processor in communication with the memory. More specifically, for example, process 600 can be implemented at an image-based automation system and executed during a record phase.

An action is detected at block 610. For example, an operating system can provide a notification of an action such as a movement of an input marker such as a mouse cursor, a mouse click occurs, or a keyboard action (or event) such as a key down action or key up action. In some implementations, the notification includes a location identifier indicating a position of the action with reference to a display, graphics or screen buffer, or a GUI, for example. Alternatively, for example, an image-based automation system implementing process 600 can detect an action by tracking or monitoring an input cursor in images accessed from a display device or graphics buffer and determining that an action has occurred based on changes in those images or of graphical objects. For example, an image-based automation system can determine that an action has occurred if the input cursor has moved or changed appearance in two or more images. As another example, an image-based automation system can determine that an action has occurred if the appearance of a graphical object has changed in appearance. As a specific example, an image-based automation system can determine that a click action has occurred if a push button control changes to a depressed state.

After the action is detected, graphical objects within an image (e.g., an image acquired or accessed in response to detection of the action) are identified at block 620. In some implementations, the entire image is parsed or analyzed to identify all the graphical objects within the image. In other implementations, a portion of the image is parsed or analyzed to identify the graphical objects within that portion of the image. For example, a portion of the image within a predefined or selected distance from the action can be analyzed to identify graphical objects.

As an example, graphical objects within an image can be identified as illustrated in blocks 621-623. A candidate graphical object is identified at block 621 using various image analysis techniques. For example, the image-based automation system implementing process 600 can include a segmentation engine that identifies candidate graphical objects based on changes in an graphical object (or in a sequence of images including the graphical object) over time, edge detection, component analysis, or other image analysis techniques to identify candidate graphical objects. Additionally, for example, the image-based automation system implementing process 600 can include an OCR engine to identify graphical objects based on text (e.g., letters, words, numbers, or other symbols at the candidate graphical objects).

The candidate graphical object is then classified at block 622. In other words, a determination is made at block 622 of whether the candidate graphical object is a graphical object (e.g., to which—if any—class of graphical object the candidate graphical object belongs). For example, the image-based automation system implementing process 600 can include a classification engine based on Support Vector Machine, K-means clustering, Mean-Shift clustering, Grab-Cut clustering, or other classification techniques.

After the candidate graphical object is classified at block 622, process 600 proceeds to block 623 to determine whether identification of graphical objects within the image is complete. That is, at block 623 it is determined whether the graphical objects in the image have been identified. In some implementations, identification of graphical objects within the image is complete after an entire image is analyzed or parsed. In other implementations, identification of graphical objects within the image is complete after a portion of an image in a predetermined or preselected proximity from a location of an action is analyzed or parsed. If identification of graphical objects within the image is complete at block 623, process 600 proceeds to block 630. Alternatively, if identification of graphical objects within the image is not complete at block 623, process 600 proceeds to block 621 to identify another candidate graphical object.

The graphical object at which the action occurred is then determined at block 630. Said differently, the graphical object relative to which the action occurred is determined at block 630. For example, a graphical object that defines an area (e.g., a perimeter of the graphical object) in which the location at which the action occurred is included is selected from the graphical objects identified at block 620.

Semantic information for the graphical object at which the action occurred is then generated at block 640. In other words, descriptive information related to the graphical object at which the action occurred is generated at block 640. For example, an image parsing engine of a semantic analysis module of the image-based automation system implementing process 600 can analyze a portion of the image in proximity to the location of the graphical object within the image to determine whether the graphical object is included within a group of graphical objects or is a portion of another graphical object. As an example, a graphical object can be an element of a composite graphical object (e.g., a graphical object that includes multiple graphical objects). As another example, a graphical object such as a radio button control of a GUI can be included within a radio button control set or group, and the radio button control set and other radio button control included in the radio button control set can be identified at block 640.

Additionally, other information about the graphical object can be extracted from the image or graphical object at block 640. For example, an image (e.g., a bitmap representation) of the graphical object, text from the graphical object, an identifier or description (e.g., third check box control in a check box control group) of the graphical object within a group of graphical objects, or other information can be extracted from the image. The information related to the graphical object generated at block 640 can then be stored at an action descriptor. Additionally, a description of the action detected at block 610 and an identifier of the class of the graphical object can be included in the action descriptor.

In some implementations, an image-based automation system implementing process 600 can operate with another software automation system. In other words, a software application can be automated using an image-based automation system and another software automation system such as, for example, a software automation system that is dependent on a runtime environment of the software application. The image-based automation system can receive additional semantic information or other information from the other software automation system after, for example, block 640. Additionally, the image-based automation system can provide semantic information or other information to the other software automation system. In other words, the image-based automation system can cooperate with the other software automation system to automate the software application.

The action associated with (e.g., that occurred at or relative to) the graphical object is determined at block 650. Said differently, the image-based automation system implementing process 600 determines what action occurred at the graphical object. For example, an action recognition engine of a temporal analysis module at the image-based automation system implementing process 600 can access an action descriptor such as an action descriptor generated or populated at block 640 with information about a graphical object and the action detected at block 610.

The action recognition engine can also access other action descriptors generated in response to earlier or prior actions, and determine whether each action in response to which the action descriptors were generated are related to a discrete or stand-alone action. That is, the action recognition engine can determine whether an action that prompted generation of an action description (e.g., an action detected at block 610) is an action that should be stored for later replay (e.g., for use in a replay or automation phase of an image-based automation engine), or is a portion or element of a composite action (e.g., an action including multiple actions such as a click and drag action).

If an action is a discrete action, the action descriptor including a description of that action and the graphical object at which (or relative to which) the action occurred can be stored at block 660. For example, the action descriptor can be output as an instruction to an automation script (e.g., a file). If the action is not a discrete action, other action descriptor can be accessed to determine whether that action is an element of a composite action. For example, multiple actions relative to a common graphical object can define a composite action. If the action descriptor is an element of a composite action, the action descriptor including a description of that action can be stored or cached at an action recognition engine. If the action descriptor is the final or completing element of a composite action, a new action descriptor (or group of action descriptors) that include descriptions of the graphical object (or graphical objects) and action (or actions) that occurred relative to the graphical object (or graphical objects) can be generated and stored (e.g., output as instructions of an automation script) at block 660.

In some implementations, block 650 can be time-limited. For example, action descriptors describing actions that are or potentially are elements of a composite action can be cached for a predetermined or preselected time period. If the composite action of which the actions described by those action descriptors is not completed (e.g., an action description describing a completing action for that composite action is not received at an action recognition engine) within the predetermined or preselected time period, those action descriptors are output as instructions of an automation script.

Process 600 can include additional or fewer blocks than those illustrated in FIG. 6. Additionally, one or more blocks of process 600 can be rearranged. For example, semantic information can be generated for each graphical object identified at block 620 and the graphical object at which the action occurred can be determined after the semantic information is generated. In other words, blocks 630 and 640 can be rearranged. As another example, other blocks can be rearranged. More specifically, for example, an image-based automation system implementing process 600 can identify a click action that results in a drop-down list opening. Subsequently, the image-based automation system can identify selection of an item in the drop-down list as a push button. The image-based automation system can determine, for example, at block 650 that this sequence is not allowed (e.g., because drop-down lists do not include push buttons). Process 600 can then return to block 620 or block 640, for example, to re-classify the item in the drop-down list or to block 640 to generate different semantic information for the item in the drop-down list. Furthermore, although process 600 is discussed above with reference to an example environment within an image-based automation system in a record phase, process 600 is applicable within other environments.

Figure 7:
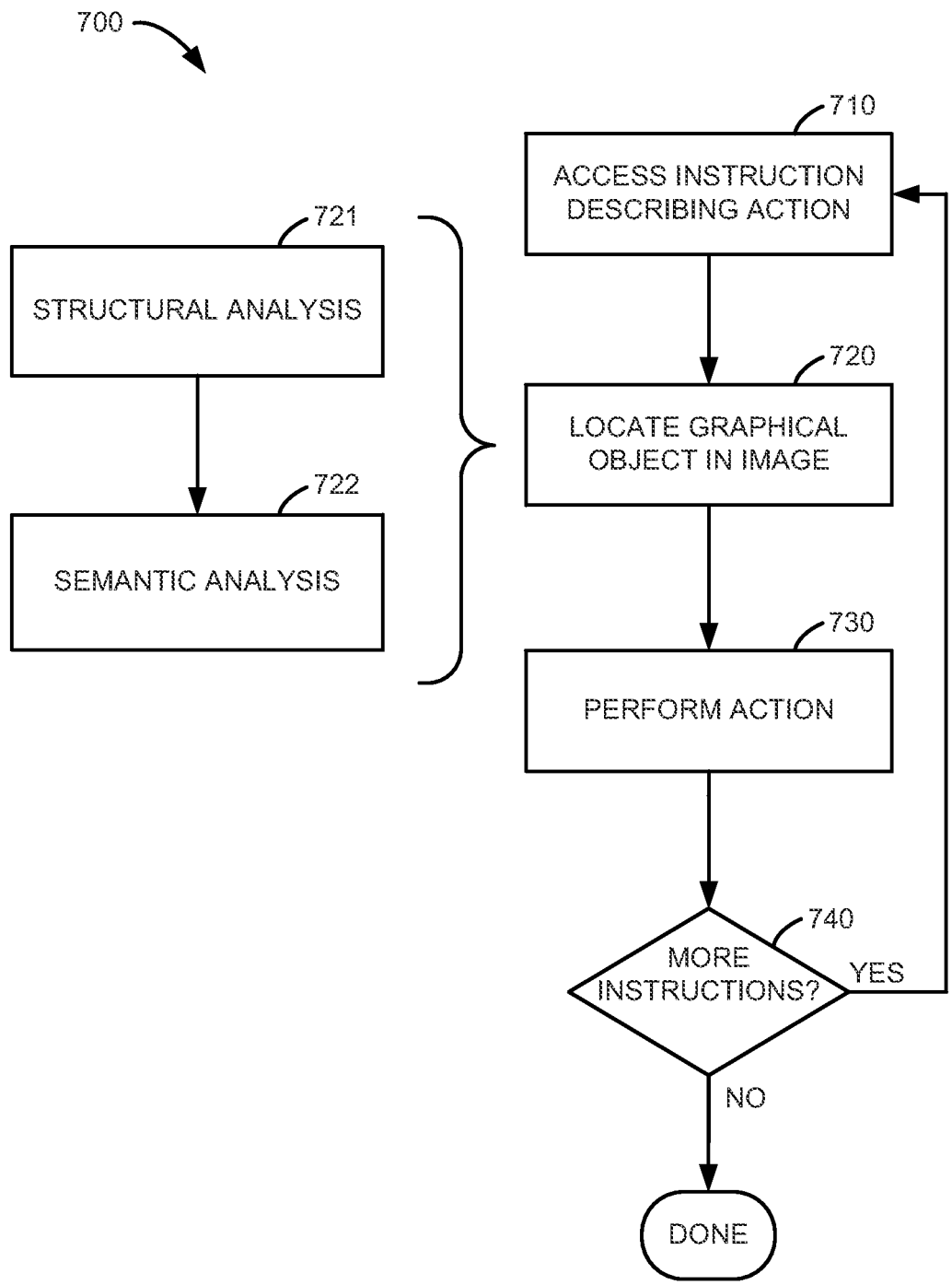
FIG. 7 is a flowchart of a process to perform an action with respect to graphical objects, according to an implementation.

FIG. 7 is a flowchart of a process to perform an action with respect to graphical objects, according to an implementation. Process 700 can be implemented as a hardware module, as a software module hosted at a computing device, and/or as a combination of a hardware module and a software module. For example, process 700 can be implemented as application-specific circuitry or as a software module including instructions stored at a memory and executed at a processor in communication with the memory. More specifically, for example, process 700 can be implemented at an image-based automation system and executed during a replay or automation phase.

An instruction describing an action is accessed at block 710. For example, an instruction at an automation script (e.g., a file at a processor-readable medium) can be accessed at block 710. The instruction includes a description of the action and the graphical object at which the action should be performed. In some implementations, an action and a graphical object can be described separately. For example, an instruction can include an identifier of the action and a reference to a description of the graphical object at which the action should be performed. A description of the graphical object can be accessed at a different file or data store (e.g., a database) based on the reference.

The graphical object is then located in an image at block 720. For example, an image of a GUI related to an automated software application can be accessed at block 720. In some implementations, the graphical object is located in the image at block 720 using image analysis techniques similar to those described above in relation to blocks 620 and 640 of process 600 illustrated in FIG. 6. More specifically, as illustrated in FIG. 7, block 720 can include structural analysis of the image at block 721 and semantic analysis of the image at block 722.

As a specific example, the image-based automation system implementing process 700 can include a structural analysis module to identify graphical objects within the image at block 721. For example, a structural analysis can identify graphical objects based on structural features of an image. More specifically, for example, graphical object can be identified based on detection of edges within the image, color differences within the image, gradients within the image, changes in the features of the image over time, component analysis, or other image analysis techniques to identify candidate graphical objects. Additionally, for example, a structural analysis can identify graphical objects based on text (e.g., letters, words, numbers, or other symbols at the candidate graphical objects).

Furthermore, graphical objects can be classified by the structural analysis. In other words, the structural analysis can include a determination of to which—if any—class of graphical object the graphical objects belong. For example, the structural analysis can use a classification engine based on Support Vector Machine, K-means clustering, Mean- Shift clustering, GrabCut clustering, changes in graphical objects (or a sequence of images including graphical objects) over time, or other classification techniques. As a specific example, an identifier of the class of graphical objects to which a graphical object belongs can be generated for each graphical object in the image or in a portion of the image.

The graphical objects identified at block 721 can be further analyzed at block 722 to extract semantic information related to those graphical objects from the image. For example, information related to a group of graphical objects in which a graphical object is included, an image (e.g., bitmap representation) of the graphical image, text from the graphical object, relative or absolute (e.g., with respect to the image or other graphical objects) position information, and/or other descriptive information about the graphical object can be generated for the graphical object during semantic analysis at block 722.

Additionally, information generated at blocks 721 and 722 can be used at block 720 to identify or locate the graphical object in the image that is described by the instruction. That is, the graphical object at which the action described in the instruction should be performed is selected or determined at block 720. For example, information generated at blocks 721 and 722 about the graphical objects in the image can be compared with a description of the graphical object in the instruction. For example, an identifier of the class to which the graphical object described in the instruction can be compared with the identifiers of the classes to which graphical objects identified at block 721 and 722; an image of the graphical object described in the instruction can be compared with images of graphical objects identified at block 721 and 722; text from the graphical object described in the instruction can be compared with text from graphical objects identified at block 721 and 722; and information about the relative position of the graphical object described in the instruction can be compared with similar information for graphical objects identified at block 721 and 722.

As discussed above, in some implementations, an image-based automation system implementing can cooperate with another software automation system. For example, the image-based automation system implementing process 700 can receive additional semantic information or other information from the other software automation system at, for example, block 720 to locate a graphical object. Additionally, the image-based automation system can provide semantic information or other information to the other software automation system.

After the graphical object described in the instruction is located, the action described in the instruction is performed at the graphical object at block 730. Said differently, the image-based automation system implementing process 700 causes the action to be performed at the graphical object located at block 720. As a specific example, an event descriptor of an operating system event or action (e.g., a mouse button down event) associated with the action described in the instruction is provided to an event or message queue of an operating system at a computing device hosting an automated software application. The event descriptor can include an identifier of the event associated with the action and a location (e.g., an x coordinate and a y coordinate) of the graphical object at a display of the computing device. The operating system can then generate the action at the graphical object.

If there are more instructions at block 740, process 700 proceeds to block 710 to access another instruction. If there are not more instructions (e.g., an automated routine is complete for an automated software application), process 700 is complete.

Figure 8:
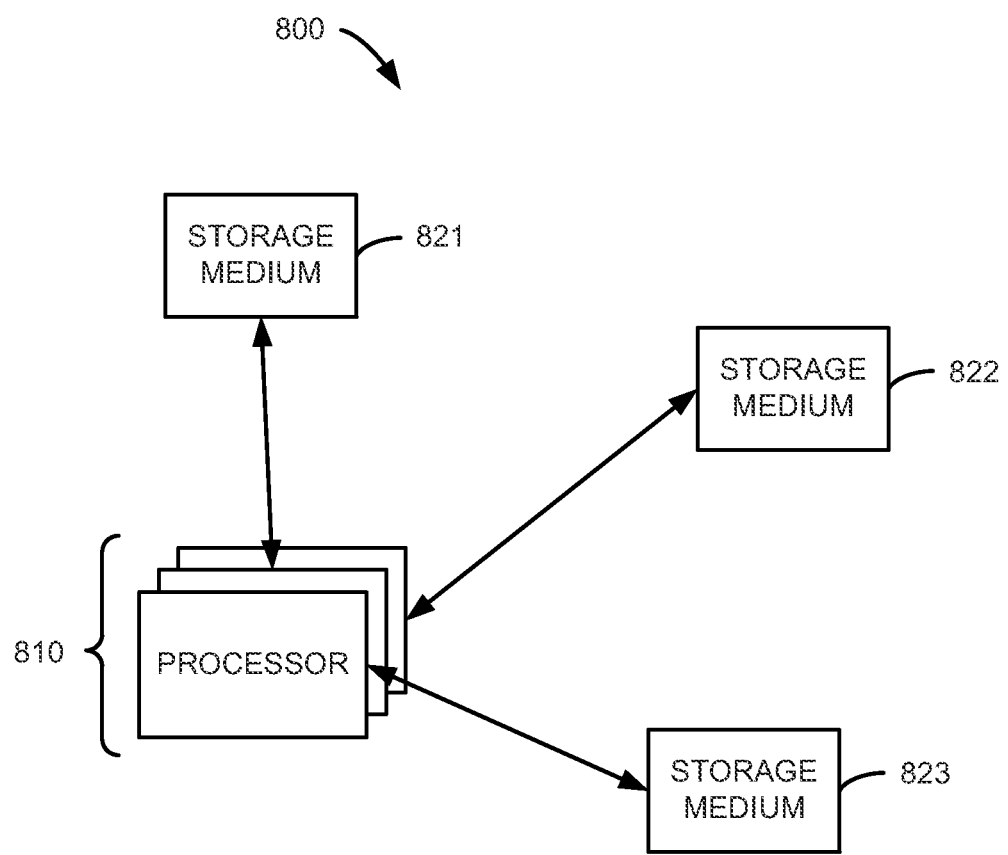
FIG. 8 is a schematic block diagram of a system including a processor and storage media, according to an implementation.

Process 700 can include additional or fewer blocks than those illustrated in FIG. 7. Additionally, one or more blocks of process 700 can be rearranged. Furthermore, although process 700 is discussed above with reference to an example environment within an image-based automation system in a record phase, process 700 is applicable within other environments. FIG. 8 is a schematic block diagram of a system including a processor and storage media, according to an implementation. As illustrated in FIG. 8, system 800 includes one or more processors 810 operatively coupled to storage medium 821, storage medium 822, and storage medium 823. One or more processors 810 can access instructions or code at storage medium 821, storage medium 822, and storage medium 823. Storage media 821, 822, and 823 can be any processor-readable media and/or related devices to access processor-readable media. For example, storage medium 821 can be a hard disk drive including a magnetic storage medium, storage medium 822 can be an optical drive such as a DVD drive and can accept DVD storage media on which processor-readable instructions such as processor-readable instructions that implement a report generation tool can be stored, and storage medium 823 can be a FLASH memory drive with a Universal Serial Bus ("USB") interface. In some implementations, storage media 821, 822, and/or 823 can be local to (e.g., coupled to a common computing device) one or more processors 810. In some implementations, storage media 821, 822, and/or 823 can be remote from (e.g., coupled to a separate computing device) one or more processors 810 and in communication with one or more processors 810 via communications link. Furthermore, one or more of storage media 821, 822, and/or 823 can be local to one or more processors 810 and one or more of the remaining of storage media 821, 822, and/or 823 can be remote from one or more processors 810.

As a more specific example, one or more processors 810 can be included within a computing device such as a computing device hosting an image-based automation module having an internal hard disk drive data store represented by storage medium 821 and a removable solid-state data store such as a Secure Digital High-Capacity ("SDHC") memory card represented by storage medium 822. The computing device can also include a USB host controller to communicate with a USB FLASH memory drive represented by storage medium 823. One or more processors 810 can access processor-executable instructions such as processor-executable instructions that implement an operating system, a software application such an image-based automation system, and/or an automated software application at any of storage media 821, 822, and/or 823. Said differently, one or more processors 810 can interpret or execute instructions at processor-readable media (e.g., at storage medium 821, storage medium 822, and/or storage medium 823). For example, a computing device can execute an image-based automation system stored at a remote storage medium.

Alternatively, for example, storage media 821 and 822 can be remote from a computing device including one or more processors 810 and storage medium 823 can be local to that computing device. The computing device including one or more processors 810 can download an image-based automation system from one or both of remote storage media 821 or 822 via a communications link such as a communications network to local storage medium 823 and execute the image-based automation system from local storage medium 823.

In some implementations, system 800 can include one or more memories such as RAM that function as a cache between one or more of storage medium 821, storage medium 822, and/or storage medium 823 and one or more processors 810 for instructions or code stored (or accessible) at one or more of storage medium 821, storage medium 822, and/or storage medium 823.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As a specific example, implementations discussed in relation to graphical user interfaces, controls of graphical user interface, and/or software automation are applicable to other environments. As another example, functionalities discussed above in relation to specific modules, engines, or elements can be included at different modules, engines, or elements in other implementations. Furthermore, it should be understood that the systems and methods described herein can include various combinations and/or sub-combinations of the components and/or features of the different implementations described. Thus, features described with reference to one or more implementations can be combined with other implementations described herein.

What is claimed is:

1. A non-transitory processor-readable medium storing instructions that when executed by a processor, cause the processor to:
   access an instruction describing an action on a graphical user interface displayed on a display;
   identify, in a first image of the graphical user interface, a graphical object displayed on the graphical user interface relative to which the action is to be performed, the graphical object having a first appearance in the first image;
   perform the action relative to the graphical object at the graphical user interface;
   identify, in a second image of the graphical user interface, the graphical object, wherein an appearance of the graphical object is changed in response to performance of the action, the graphical object having a second appearance in the second image; and
   generate semantic information related to the first appearance and the second appearance of the graphical object, the semantic information semantically describing an appearance of the graphical object both prior to and after performance of the action such that the action performed relative to the graphical object is identifiable from the semantic information.

2. The non-transitory processor-readable medium of claim 1, wherein to identify the graphical object displayed on the graphical user interface, the instructions are further to cause the processor to perform a structural analysis of the image to identify structural features of the graphical object and perform semantic analysis of the image to identify text in the graphical object.

3. The non-transitory processor-readable medium of claim 1, wherein the action is a first action and the instructions are further to cause the processor to perform a second action relative to the graphical object, the first action and the second action associated with a composite action.

4. The non-transitory processor-readable medium of claim 1, wherein:
   the graphical object is an element of a composite graphical object; and
   wherein the instructions are further to cause the processor to identify the composite graphical object.

5. The processor-readable medium device of claim 1, wherein the identifying comprises using changes in the image over time to identify candidate graphical objects that include the graphical object.

6. An image-based automation system comprising circuitry that performs operations, comprising:
   a structural analysis module to identify a graphical object within a first image and a second image, wherein the first image includes the graphical object having a first appearance prior to performance of an action relative to the graphical object and a second appearance following performance of the action;
   a semantic analysis module to generate semantic information related to the first appearance and the second appearance of the graphical object, the semantic information semantically identifying structural features of the graphical object both prior to and after performance of the action, wherein the action relative to the graphical object is identifiable from the semantic information; and
   a temporal analysis module to determine whether another action is associated with the graphical object based on a temporal proximity of the semantic information to the other action.

7. The image-based automation system of claim 6, wherein
   the structural analysis module includes a segmentation engine to identify the graphical object based on structural features of the image.

8. The image-based automation system of claim 6, wherein
   the structural analysis module includes a classification engine to classify the graphical object.

9. The image-based automation system of claim 6, wherein the action is a first action at a first time and the graphical object is a control of a graphical user interface, further comprising:
   an image acquisition module to access the image in response to a second action at a second time after the first time, the second action being an action relative to the graphical object.

10. The image-based automation system of claim 6, wherein:
    the action is a first action at the graphical object at a first time;
    the structural analysis module is to identify the graphical object in response to a second action at the graphical object a second time after the first time;
    the semantic analysis module is to refine the semantic information after the second time in response to the second action; and
    the temporal analysis module is to determine that the first action is associated with the graphical object and to define an action descriptor based on the semantic information.

11. The image-based automation system of claim 6, the temporal analysis module to determine whether multiple sub-actions should be aggregated into the action with respect to the graphical object.

12. The image-based automation system of claim 6, wherein the action is a first action, and the temporal analysis module is to aggregate a first semantic description of the first action with a second semantic description of a second action into a third semantic description.

13. The image-based automation system of claim 6, wherein the temporal analysis module is to determine that a semantic description received in response to the action is a complete action in response to no other semantic descriptions associated with the graphical object being received within a predetermined time period.

14. An image-based automation method, comprising:
identifying, by a processor, a graphical object at an image in response to performance of an action with respect to a graphical user interface on which the graphical object is displayed;
generating, by the processor, semantic information associated with the graphical object, the semantic information semantically identifying structural features of the graphical object both prior to and after performance of the action, wherein the action performed on the graphical object is identifiable from the semantic information; and
storing, by the processor, an action descriptor describing the action and including the semantic information.

15. The image-based automation method of claim 14, wherein the action is a first action, the method further comprising:
determining that a second action is associated with the graphical object; and
defining the action descriptor based on the first action and the second action.

16. The image-based automation method of claim 14, wherein
the action descriptor is stored as an instruction at a script file.

17. The image based-automation method of claim 14, further comprising:
determining that the action occurred at the graphical object.

18. The image-based automation method of claim 14, wherein the semantic information includes a semantic description of the graphical object having a first appearance prior to performance of the action and the graphical object having a second appearance following performance of the action, wherein the appearance is at least one of a color, a size, and a shape of the graphical object.

19. The image-based automation method of claim 14, further comprising determining that the action has occurred based on identifying a change in the image as compared to another image containing the graphical object.

20. The image-based automation method of claim 14, wherein the identifying comprises analyzing a portion of the image within a predefined distance from the action to identify the graphical object.

* * * * *